United States Patent [19]

Sato et al.

[11] Patent Number: 4,603,184

[45] Date of Patent: * Jul. 29, 1986

[54] PROCESS FOR PRODUCING ALPHA-OLEFIN POLYMERS

[75] Inventors: Akihiro Sato; Toshihiro Uwai; Masami Tachibana; Kenji Matsuda; Yoshiharu Higuchi, all of Chibaken, Japan

[73] Assignee: Chisso Corporation, Osaka, Japan

[*] Notice: The portion of the term of this patent subsequent to Dec. 13, 2000 has been disclaimed.

[21] Appl. No.: 489,722

[22] Filed: Apr. 29, 1983

Related U.S. Application Data

[63] Continuation of Ser. No. 319,398, Nov. 9, 1981, abandoned.

[30] Foreign Application Priority Data

Jul. 23, 1981 [JP] Japan ................................ 56-115509

[51] Int. Cl.$^4$ ......................... C08F 4/02; C08F 10/00
[52] U.S. Cl. ................................... 526/142; 502/108; 502/126; 526/114; 526/116; 526/119; 526/122; 526/139; 526/140; 526/141; 526/351; 526/903; 526/904
[58] Field of Search ...................... 526/119, 127, 142

[56] References Cited

U.S. PATENT DOCUMENTS

| | | | |
|---|---|---|---|
| 4,295,991 | 10/1981 | Wristers | 526/142 |
| 4,309,521 | 1/1982 | Sato et al. | 526/119 |
| 4,368,304 | 1/1983 | Sato et al. | 526/119 |
| 4,420,593 | 12/1983 | Sato et al. | 526/142 |
| 4,460,757 | 7/1984 | Sato et al. | 526/127 |

FOREIGN PATENT DOCUMENTS 55-12875  1/1980  Japan .

*Primary Examiner*—Edward J. Smith
*Attorney, Agent, or Firm*—Fred Philpitt

[57] ABSTRACT

A process for producing α-olefin polymers is proposed wherein the catalyst prepared and used therein is superior in the shelf stability and heat stability. The process comprises reacting TiCl$_4$ with a reaction product (I) of an organoaluminum compound with an electron donor to obtain a solid product (II), which is then subjected to polymerization treatment with an α-olefin, and further reacted with an electron donor and an electron acceptor to obtain a solid product (III), which is then combined with an organoaluminum compound, to obtain a catalyst, in the presence of which α-olefin(s) are polymerized. The catalyst can be further preactivated with an α-olefin in advance of its use for the polymerization.

15 Claims, No Drawings

PROCESS FOR PRODUCING ALPHA-OLEFIN POLYMERS

This is a continuation of application Ser. No. 319,398, filed Nov. 9, 1981, now abandoned.

BACKGROUND OF THE INVENTION

1. Field of the Invention

This invention relates to a process for producing α-olefin polymers. More particularly it relates to a process for producing α-olefin polymers having a high crystallinity and a good particular form with a high yield, by the use of a novel catalyst suitable for α-olefin polymerization, particularly gas phase polymerization and further a combination of slurry or bulk polymerization with gas phase polymerization as a modification of gas phase polymerization.

2. Description of the Prior Art

It is well known that α-olefins are polymerized by means of the so-called Ziegler-Natta catalysts consisting of a compound of metals of Groups IV–VI of the Periodic Table and an organometallic compound of metals of Groups I~III of the Table, including those modified by adding an electron donor, etc. Among the above transition metal compounds as a component of the catalysts, titanium trichloride has been most broadly used for obtaining highly crystalline polymers such as those of propylene, butene-1, etc. Such titanium trichloride is classified into the following three kinds according to its preparation:

(1) a product obtained by reducing $TiCl_4$ with hydrogen followed by milling for activation by means of a ball mill (which is referred to as titanium trichloride (HA));

(2) a product obtained by reducing $TiCl_4$ with metallic aluminum, followed by ball milling for activation, i.e. a compound expressed by the general formula $TiCl_3 \cdot \frac{1}{3} AlCl_3$ (which is the so-called titanium trichloride (AA)); and (3) a product obtained by reducing $TiCl_4$ with an organoaluminum compound followed by heat treatment.

However, since any of these kinds of titanium trichloride are not fully satisfactory, various improvements have been considered and tried. As one of them, a process has been proposed wherein the titanium trichloride obtained by reducing $TiCl_4$ with an organoaluminum compound is further treated with an electron donor and $TiCl_4$ to thereby raise its catalyst activity and also reduce the amount of an amorphous polymer formed (e.g. Japanese patent application laid-open No. Sho 47-34478/1972). However, such a process has a drawback in that the resulting catalyst lacks heat-stability.

Further, another process has also been proposed wherein $TiCl_4$ and an organoaluminum compound are respectively and separately mixed and reacted with a definite amount of a complex-forming agent (electron donors being one kind thereof), followed by mixing and reacting together the resulting two reaction liquids to prepare a solid catalyst component (Japanese patent application laid-open No. Sho 53-9296/1978). However, this process also has a drawback in that the resulting catalyst lacks heat stability, as in the case of the above Japanese patent application laid-open No. Sho 47-34478/1972).

Furthermore, there have been proposed a process of adding to $TiCl_4$, a uniform liquid material consisting of an organoaluminum compound and an ether or inverting this addition order to prepare a liquid product containing titanium trichloride (Japanese patent application laid-open No. Sho 52-115797/1977), and a process of further heating the above liquid product to 150° C. or lower to deposit finely particular titanium trichloride (Japanese patent application laid-open No. Sho 52-47594/1977), but these processes also have a drawback in that the resulting catalysts lack heat stability.

On the other hand, as for the phase in which the polymerization processes using Ziegler-Natta catalysts are carried out, slurry polymerization carried out in a solvent such as n-hexane (e.g. Japanese patent publication No. Sho 32-10596/1957), bulk polymerization carried out in a liquefied monomer such as liquefied propylene (e.g. Japanese patent publications No. Sho 36-6686/1961 and No. Sho 38-14041), and gas phase polymerization carried out in a gaseous monomer such as gaseous propylene (e.g. Japanese patent publication Nos. Sho 39-14812/1964 and Sho 42-17487/1964) have been well known, and further a process of bulk polymerization followed by gas phase polymerization has also been known (e.g. Japanese patent publication No. Sho 49-14862/1974 and Japanese patent application laid-open No. Sho 51-135987/1973). Among these processes, the gas phase polymerization process has advantages in that neither recovery and reuse of solvent nor those of liquefied monomer such as liquefied propylene, used in polymerization are necessary, whereby the recovery cost of solvent or monomer is slight and it is possible to simplify equipments for producing α-olefin polymers. Gas phase polymerization process, however, have drawbacks in that since the monomer inside the polymerization vessel is present in gas phase, the monomer concentration is so low as compared with those in the slurry or bulk polymerization, that the reaction rate is so slow; hence the retention time must be increased to raise the polymer yield per unit weight of the catalyst, which, however, results in enlargement of the reactor, or a modified trialkylaluminum must be used to raise the catalyst activity, which, however, results in reduction of the stereoregularity of the resulting polymer. Further in the case of gas phase polymerization process, polymer particles are liable to become ununiform due to the ununiform catalyst particles. This is liable to cause cohesion of polymer particles or clogging at the discharge port of the polymerization vessel or on the transportation line, resulting in difficulty in a long term stabilized continuous operation and a large dispersion of the quality.

The present inventors previously invented a polymerization process having no drawbacks as above even in the case of gas phase polymerization, i.e. a process for producing α-olefin polymers wherein α-olefins are polymerized in the presence of a catalyst prepared by reacting $TiCl_4$ with a reaction product of an organoaluminum compound with an electron donor, reacting the resulting solid product with an electron donor and an electron acceptor and combining the resulting solid product with an organoaluminum compound (Japanese patent application No. Sho 55-12875/1980, which will hereinafter be referred to as the prior invention). This prior invention has been characterized in that a long term, stabilized operation of gas phase polymerization is possible; the shelf stability of the catalyst and its heat stability during polymerization are high; the polymer yield by way of gas phase polymerization amounts to 5,000 to 6,000 g/g of solid product; and the amount of amorphous polymer formed is reduced. However, the shelf stability of the catalyst at high temperatures of 35° C. or higher has been insufficient, and further a catalyst having a higher heat stability during the polymerization has been required.

Thus, the object of the present invention is to provide a process for producing α-olefin polymers by the use of a catalyst having an improved shelf stability and heat stability, which, even when used in gas phase polymerization, slurry polymerization or bulk polymerization, has a high catalyst activity; can yield a polymer having a uniform particle size, with a low percentage of amorphous polymer formed; and particularly can exhibit the advantages of gas phase polymerization.

The present inventors have further continued studies for improvement and have found that the shelf stability and heat stability of the catalyst can be further improved by subjecting the solid obtained by reacting $TiCl_4$ with a reaction product of an organoaluminum compound with an electron donor, to a polymerization treatment with an α-olefin, followed by reaction with an electron donor and an electron acceptor, and have attained the present invention.

SUMMARY OF THE INVENTION

The present invention resides briefly in:

a process for producing α-olefin polymers which comprises polymerizing α-olefins in the presence of a catalyst prepared by reacting $TiCl_4$ (C) with a reaction product of a reaction product (I) of an organoaluminum compound ($A_1$) with an electron donor ($B_1$) to form a solid product (II);

subjecting this solid product (II) to a polymerization treatment with an α-olefin; further reacting the resulting material with an electron donor ($B_2$) and an electron acceptor (E) to form a solid product (III); and combining this solid product (III) with an organoaluminum compound ($A_2$).

The terms "subjecting to a polymerization treatment" referred to in the present invention means that a small amount of an α-olefin is contacted with the solid product (II) under polymerizable conditions to polymerize the α-olefin. This polymerization treatment brings the solid product (II) into a state where the solid product is coated with the resulting polymer.

The above prior invention No. Sho 55-12875/1980 is different from the present invention in that the solid product (II) is directly reacted with($B_2$)and (E) without the above polymerization treatment. The effectiveness of this polymerization treatment will be evidenced in Examples and Comparative examples mentioned later.

DESCRIPTION OF THE PREFERRED EMBODIMENTS

The preparation of the catalyst used in the present invention will be described below.

The preparation of the solid product (III) is carried out as follows:

An organoaluminum compound is first reacted with an electron donor to obtain a solid product (I), which is then reacted with $TiCl_4$ to obtain a solid product (II), which is further subjected to a polymerization treatment with an α-olefin, followed by reacting the resulting product with an electron donor and an electron acceptor to obtain a solid product (III).

The reaction of an organoaluminum compound ($A_1$) with an electron donor ($B_1$) is carried out in a solvent (D) at a temperature of $-20°$ C. to $+200°$ C., preferably $-10°$ C. to $+100°$ C., for a period of 30 seconds to 5 hours. The addition order of ($A_1$), ($B_1$) and (D) has no particular limitation, and the proportion of their amounts used is suitably 0.1 to 8 mols, preferably 1 to 4 mols, of the electron donor and 0.5 to 51, preferably 0.5 to 21, of the solvent, based on one mol of the organoaluminum. The solvent is preferably aliphatic hydrocarbons. Thus the reaction product (I) is obtained. The reaction product (I) may be subjected, in the liquid state where the reaction has completed, as it is, to the subsequent reaction, such a liquid in the liquid state being hereinafter referred to as reaction liquid (I).

As for the process for subjecting the solid product (II) obtained by reacting the reaction liquid (I) with $TiCl_4$, to a polymerization treatment with an α-olefin, there are (1) a process of adding an α-olefin at an optional time during the course of the reaction of the reaction liquid (I) with $TiCl_4$ to subject the solid product (II) to a polymerization treatment; (2) a process of adding an α-olefin after completion of the reaction of the reaction liquid (I) with $TiCl_4$ to subject the solid product (II) to a polymerization treatment; and (3) a process of separating and removing by filtering-off or decantation, a liquid portion after completion of the reaction of the reaction liquid (I) with $TiCl_4$, followed by suspending the resulting solid product (II) in a solvent and further adding an organoaluminum compound and an α-olefin to subject the resulting materials to a polymerization treatment.

The reaction of the reaction liquid (I) with $TiCl_4$ (C) is carried out at a temperature of 0° to 200° C., preferably 10° to 90° C., more preferably 30° to 90° C., for a period of 5 minutes to 10 hours, in spite of whether an α-olefin is added or not at an optional time during the course of the reaction. Although it is preferable not to use a solvent, an aliphatic or aromatic hydrocarbon may be used. Mixing of (I), (C) and the solvent may be carried out in any order, and the addition of an α-olefin may also be carried out at any stage. The mixing of the total amount of (I), (C) and the solvent is preferably completed within 5 hours, and during the mixing, the reaction is also carried out. After the mixing of the total amount, the reaction is preferably continued further for at most 5 hours. As for the respective amounts used for the reaction, the solvent is used in 0 to 3,000 ml based on one mol of $TiCl_4$, and the reaction product (I) is used in a ratio of the number of Al atoms in the product (I) to that of Ti atoms (Al/Ti) of 0.05 to 10, preferably 0.06 to 0.3.

If the polymerization treatment with an α-olefin is carried out either when the α-olefin is added at an optional time during the course of the reaction of the reaction liquid (I) with $TiCl_4$, or when the α-olefin is added after completion of the reaction, the α-olefin is added at a reaction temperature of 30° to 90° C. for 5 minutes to 10 hours by feeding the α-olefin under the atmospheric pressure or so as to give a pressure of 10 $kg/cm^2G$ or lower. The amount of the α-olefin added is 10 to 5,000 g of α-olefin based on 100 g of the solid product (II), and the amount of α-olefin polymerized is preferably 0.05 to 100 g.

On the other hand, if the polymerization treatment with an α-olefin is carried out after completing the reaction of the reaction liquid (I) with $TiCl_4$ and then separating and removing a liquid portion by filtering-off or decantation, followed by suspending the resulting solid product (II) in a solvent, then it is preferable to add 100 to 2,000 ml of a solvent and 5 to 500 g of an organoaluminum compound, each based on 100 g of the solid product (II) and also add 10 to 5,000 g of an α-olefin under 0 to 10 kg/cm²G at a reaction temperature of 30° to 90° C. for 5 minutes to 10 hours to polymerize 0.05 to 100 g of the α-olefin. The solvent is preferred to be an aliphatic hydrocarbon, and the organoaluminum compound may be the same as or different from that used for the reaction liquid (I). After completion of the reaction, the liquid portion is separated and removed by filtering-off or decantation, followed by repeated washings with a solvent. The resulting solid product thus subjected to the polymerization treatment (this solid product will hereinafter be referred to often as solid product "II-A") may be used in the state where the solid product is suspended in the solvent, as it is, in the subsequent step, or used as a solid product obtained by further drying the above suspension and taking out the resulting dried product, in the subsequent step.

The solid product (II-A) is then reacted with an electron donor ($B_2$) and the electron acceptor (E). While this reaction may be carried out without using any solvent, preferable results are obtained when an aliphatic hydrocarbon is used. The amount of $B_2$ used is 10 to 1,000 g, preferably 50 to 200 g; that of (E) is 10 to 1,000 g, preferably 20 to 500 g; and that of the solvent is 0 to 3,000 ml, preferably 100 to 1,000 ml, each based on 100 g of the solid product (II-a). These three or four substances are preferably mixed at a temperature of $-10°$ C. to $+40°$ C. for a period of 30 seconds to 60 minutes, followed by reaction at a temperature of 40° to 200° C., preferably 50° to 100° C., for a period of 30 seconds to 5 hours. The mixing order of the solid product (II-A), ($B_2$), (E) and the solvent has no particular limitation. ($B_2$) and (E) may be reacted in advance of mixing them with the solid product (II-A), and in this case, ($B_2$) and (E) are reacted at a temperature of 10° to 100° C. for a time of 30 minutes to 2 hours and cooled down to 40° C. or lower; the resulting product is then mixed with the above solid product. After completion of the reaction of (II-A), ($B_2$) and (E), the liquid portion is separated and removed by filtering-off or decantation, followed by repeated washings with a solvent to obtain a solid product (III), which is then dried, taken out as a solid matter and used in the subsequent step or used in the suspension state in the solvent, as it is, in the second step.

The solid product (III) thus obtained is then combined with an organoaluminum in a proportion of 0.1 to 500 g of the latter based on 1 g of the former to prepare a catalyst or preferably the combination is further reacted with an a-olefin to prepare a preactivated catalyst.

Organoaluminum compounds used in the present invention are expressed by the general formula $AlR_nR'_nX_{3-(n+n')}$ (wherein R and R' each represent a hydrocarbon group such as an alkyl group of 1 to 15C, an aryl group of 6 to 12C, an alkaryl of 7-15C, a cycloalkyl group of 6 to 12C or an alkoxy group of 1 to 15C; X represents fluorine, chlorine, bromine or iodine; and n and n' each represent an optional number of $0 < n+n' \leq 3$). Concrete examples thereof are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-i-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; dialkylaluminum hydrides such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used. These organoaluminum compounds may be used in admixture of two kinds or more. The organoaluminum compound ($A_1$) used for preparing the solid product (I) and the organoaluminum compound ($A_2$) combined with the solid product (III) may be the same or different.

As for the electron donors employed in the present invention, various kinds are illustrated below, but it is preferable for ($B_1$) and ($B_2$) that electron donors composed singly or mainly (more than 50% by mol based on the total mols thereof) of ethers be employed and those other than ethers be employed together with ethers. As for the electron donors employed, organic compounds containing at least one atom of oxygen, nitrogen, sulfur and phosphorus, such as ethers, alcohols, esters, aldehydes, fatty acids, aromatic acids, ketones, nitriles, amines, amides, urea, thiourea, isocyanates, azo compounds, phosphines, phosphites, phosphinites, $H_2S$, thioethers, thioalcohols, etc. are mentioned. As for concrete examples, ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, ethylene glycol monoethyl ether, diethylene glycol dimethyl ether, tetrahydrofuran; alcohols such as methanol, ethanol, propanol, butanol, pentanol, hexanol, octanol; phenols such as phenol, cresol, xylenol, ethylphenol, naphthol; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, $\beta$(N,N-dimethylamino) ethanol, pyridine, quinoline, α-picoline, 2, 4, 6-trimethylpyridine, N,N,N',N'-tetramethylhexaethylenediamine, aniline, dimethylaniline; amides such as formamide, hexamethyl phosphoric acid triamide, N,N,N',N',N"-pentamethyl-N'-$\beta$-dimethylaminomethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned. These electron donors may be employed in admixture. The electron donor (B₁) for obtaining the reaction product (I), and (B₂) to be reacted with the solid product (II) may be the same or different.

The electron acceptors, (E) used in the present invention are represented by halides of elements of III Group to VI Group of the Periodic Table. As concrete examples, anhydrous $AlCl_3$, $SiCl_4$, $SnCl_2$, $SnCl_4$, $TiCl_4$, $ZrCl_4$, $PCl_3$, $PCl_5$, $VCl_4$, $SbCl_5$, etc. are mentioned. They may be employed in admixture. $TiCl_4$ is most preferable.

As for the solvent, the following ones are employed: As aliphatic hydrocarbons, n-pentane, n-hexane, n-heptane, n-octane, i-octane, etc. are mentioned. Further, in place of the aliphatic hydrocarbons or together therewith, halogenated hydrocarbons such as carbon tetrachloride, chloroform, dichloroethylene, trichloroethylene, tetrachloroethylene, etc. may be also employed. As for aromatic compounds, aromatic hydrocarbons such as naphthalene, and as their derivatives, alkyl substitutes such as mesitylene, durene, ethylbenzene, isopropylbenzene, 2-ethylnaphthalene, 1-phenylnaphthalene, etc., and halides such as monochlorobenzene, chlorotoluene, chloroxylene, chloroethylbenzene, dichlorobenzene, bromobenzene, etc. are mentioned.

As for the α-olefin employed for the polymerization treatment, straight chain monoolefins such as ethylene, propylene, butene-1, pentene-1, hexene-1, heptene-1 and branched chain monoolefins such as 4-methyl-pentene-1, 2-methyl-pentene-1, 3-methyl-butene-1, and styrene, etc. are mentioned. These olefins may be the same as or different from α-olefins employed for preactivation or polymerization, and may be employed in admixture of two or more kinds.

In the slurry or bulk polymerization, even a catalyst consisting of a combination of the solid product (III) with an organoaluminum compound exhibits a sufficient effectiveness, but in the case of gas phase polymerization, it is preferable to further react an α-olefin with the above catalyst to preactivate it. In the case of slurry or bulk polymerization followed by gas phase polymerization, even if the former catalyst (unpreactivated catalyst) is initially used, reaction of this catalyst with an α-olefin is already complete before the gas phase polymerization; hence the catalyst is changed to the same one as the latter catalyst (preactivated catalyst) to exhibit superior effectiveness.

In the preactivation, it is desirable to use 0.1 to 500 g of an organoaluminum, 0 to 50 l of a solvent, 0 to 1,000 ml of hydrogen and 0.05 to 5,000 g, preferably 0.05 to 3,000 g of an α-olefin, each based on 1 g of the solid product (III), and react them with an α-olefin at a temperature of 0° to 100° C. for a period of one minute to 20 hours to react 0.01 to 2,000 g, preferably 0.05 to 200 g of the α-olefin based on 1 g of the solid product (III).

The preactivation may be carried out in a hydrocarbon solvent such as propane, butane, n-pentane, n-hexane, n-heptane, benzene, toluene, or in a liquefied α-olefin such as liquefied propylene, liquefied butene-1, or in an α-olefin gas such as ethylene gas, propylene gas. Further, hydrogen may be made coexistent in the preactivation.

In advance of the preactivation, polymer particles obtained by slurry, bulk or gas phase polymerization may be made coexistent. Such polymer may be the same as or different from α-olefin polymers as the object of polymerization. The amount of such polymer capable of being made coexistent may be in the range of 0 to 5,000 g per g of the solid product (III).

The solvent or α-olefin employed in the preliminary activation may be removed by distilling off, filtration or the like means, midway during the preliminary activation or after completion of the activation. Further, for suspending the solid product in a solvent of 80 l or less per g of the solid product, the solvent may be added.

The preactivation method includes various embodiments such as (1) a method wherein a catalyst obtained by combining the solid product (III) with an organoaluminum is contacted with an α-olefin to subject it to slurry, bulk or gas phase reaction; (2) a method wherein the solid product (III) is combined with an organoaluminum in the presence of an α-olefin; (3) a method wherein an α-olefin polymer is made coexistent in the method (1) or (2); and (4) a method wherein hydrogen is made coexistent in the method (1), (2) or (3). As to whether the catalyst is brought into the slurry state or into the form of powder, there is no essential difference therebetween.

The catalyst obtained as above by combining the solid catalyst (III) with an organoaluminum in a conventional manner or the catalyst obtained by further preactivating the above catalyst with an α-olefin is used for producing α-olefin polymers. The polymerization may be carried out either by slurry polymerization in a hydrocarbon solvent or by bulk polymerization in liquefied α-olefin monomer, but, in the present invention, since the catalyst has a high activity, gas phase polymerization of α-olefins exhibits a particularly notable effectiveness, and slurry or bulk polymerization followed by gas phase polymerization as a modification of gas phase polymerization also exhibits a desirable effectiveness.

The gas phase polymerization of α-olefins may be carried out not only in the absence of solvent such as n-hexane, n-heptane, but also in a state where 0 to 500 g of solvent per Kg of α-olefin polymer is contained. Further it may be carried out either by continuous polymerization or batch polymerization. Furthermore, it may be carried out in fluidized bed manner, or in fluidized manner by way of agitating elements, or in stirring manner by way of vertical or horizontal type paddle.

As for the method of slurry or bulk polymerization followed by gas phase polymerization, of α-olefins, the following are illustrated: for example, in the case of batch polymerization, a method wherein α-olefin is polymerized in a solvent or liquefied α-olefin monomer, and thereafter the solvent or α-olefin monomer is removed so that it is contained in an amount of 500 g or less per Kg of polymer particles, followed by polymerizing α-olefin in vapor phase, and a method wherein polymerization of α-olefin is continued without removing the solvent or liquefied α-olefin, and moves into gas phase polymerization without adding any operation since the solvent or liquefied α-olefin is absorbed in the resulting polymer. A plural step polymerization consisting of a combination of slurry or bulk polymerization with gas phase polymerization exhibits a desirable result particularly in the case of continuous polymerization. This plural step polymerization may be carried out as follows: In the first step, slurry or bulk polymerization is carried out wherein the polymerization is continued so as to give a slurry concentration [(polymer (Kg))/(polymer (Kg) +solvent or liquefied α-olefin (Kg))×100%] of 70% or higher, or the polymerization is carried out until a slurry concentration reaches 30 to 50%, and thereafter solvent or liquefied α-olefin is removed so as to give a slurry concentration of 70% or higher; and in the second step, α-olefin is subjected to vapor phase polymerization. In this method, the catalyst is added at the time of slurry or bulk polymerization of the first step, and in the gas phase polymerization successively carried out, the catalyst of the first step may be sufficiently employed as it is, but a fresh catalyst may be also added in the second step. As for the proportion of the weight of polymer formed by slurry or bulk polymerization and that of polymer formed by gas phase polymerization, it is preferable that the proportion be in the range of 0.1 to 100 parts by weight of polymer of gas phase polymerization based on one part of polymer of slurry or bulk polymerization.

As for the polymerization conditions of α-olefins, any of slurry polymerization, bulk polymerization and gas phase polymerization may be carried out at a polymerization temperature of room temperature (20° C.) to 200° C., under a polymerization pressure of the atmospheric pressure (0 kg/cm²G) to 50 kg/cm²G and usually for 5 minutes to 10 hours. In the polymerization, addition of a suitable amount of hydrogen for adjustment of molecular weight, and the like means are carried out as in conventional manner.

As for the α-olefins employed in the polymerization of the present invention, straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The main effectiveness of the present invention is that by the use of a catalyst having an improved shelf stability and also an improved heat stability, it has become possible to obtain a highly crystalline polymer in a good form of powder with a high polymer yield even in the case of gas phase polymerization in which the monomer concentration is relatively low.

The effectiveness of the present invention will be further concretely described.

The first effectiveness of the present invention is that the shelf stability and heat stability of catalyst have been further improved. For example, even when the solid product (III) is allowed to stand at a high temperature of about 40° C. over about 4 months, its polymerization activity is not reduced; hence no particular storage equipment is required for storing the solid product (III). Further, even when the solid product (III) is combined with an organoaluminum compound and this combination is allowed to stand at a temperature of 40° C. or higher, in a high concentration of the solid product (III) of 1% or higher, over about one week since the time of the combination till the initiation of polymerization, the polymerization activity is not reduced, fine pulverization due to agitation in the catalyst tank hardly occurs and the form of polymer particles does not deteriorate. Further, in the propylene polymerization, a higher temperature polymerization is possible at 80° C. or higher in the case of slurry or bulk polymerization and at 85° C. or higher in the case of gas phase polymerization; the form of polymer particles does not deteriorate; and a higher catalyst activity is obtained. Since such a higher temperature polymerization is possible, the temperature difference between the temperature of polymerization and that of cooling water can be made larger; hence the heat-removing performance is increased and the productivity per a polymerization vessel can be elevated.

The second effectiveness of the present invention is that the resulting catalyst has a very high activity and while it is, of course, possible to obtain a high polymer yield in slurry or bulk polymerization, the polymer yield per g of the solid product (III) amounts to 6,200 to 9,000 g (polymer) even in the case of gas phase polymerization in which the monomer concentration is relatively low.

The third effectiveness of the present invention is that since the polymer is obtained with a higher yield, even when the amounts of alcohols, alkylene oxides, steam, etc. used for killing the catalyst and purifying the resulting polymer after the polymerization are further reduced, no coloration of polymer occurs, but a polymer having a yellow index (YI) of 0 to 3.0 is obtained. Further, no corrosive gas evolves which has a bad influence of injuring physical properties of polymer or rusting the mold at the time of polymer molding.

The fourth effectiveness of the present invention is that the percentage of amorphous polymer formed is reduced in the production of α-olefin polymers, and the effectiveness is larger particularly in the production of copolymers. For example, in the production of propylene polymers, the amount of isotactic polypropylene as n-hexane-insoluble (at 20° C.) amounts to 98 to 99.8% in terms of isotactic index, and the amount of atactic polymer as n-hexane-soluble is only 0.2 to 2% in terms of isotactic index. Thus, even when the atactic polymer is not removed, the disadvantage of degrading the physical properties of the polymer such as toughness and heat stability is overcome; hence it is possible to omit the removal step of the atactic polymer to thereby simplify the production process of the polymer.

The fifth effectiveness of the present invention is that the resulting polymer particles have a good form and a small average particle size, 90 to 99% of the particles being included between 32 and 60 meshes. The particles are nearly spherical; the amounts of rough and large particles and fine ones are reduced; and the parcle size distribution is narrow. Further the bulk density (BD) of the polymer is in the range of 0.45 to 0.52; a small volume of the storage tank per unit weight of polymer is sufficient; the production plant of polymer can be made more compact; the clogging trouble on the line due to the cohesion of polymer particles as well as the transportation trouble due to fine powder particles are not observed; thus it has become possible to carry out a long term operation even in the case of gas phase polymerization.

EXAMPLE 1

(1) Preparation of solid product (III)

n-Hexane (60 ml), diethylaluminum monochloride (DEAC) (0.05 mol) and diisoamyl ether (0.12 mol) were mixed together at 25° C. for one minute and reacted at the same temperature for 5 minutes to obtain a reaction liquid (I) (molar ratio of diisoamyl ether/DEAC: 2.4). TiCl$_4$ (0.4 mol) was placed in a nitrogen gas-purged reactor and heated to 35° C. and the total amount of the above reaction liquid (I) was dropwise added thereto over 180 minutes, followed by keeping the resulting mixture at the same temperature for 60 minutes, raising the temperature up to 80° C. and reacting it further for one hour to obtain a solid product (II). The reaction liquid was then cooled down to 50° C. and propylene (2.85 g) was added, followed by a polymerization treatment at 50° C. for 2 hours. After the treatment, the temperature was raised up to 70° C. and the supernatant liquid was removed, followed by 4 times repeating a procedure of adding n-hexane (400 ml) and removing the supernatant liquid by decantation to obtain a solid product (II) (20.4 g) (i.e. 19.0 g of solid product (II) plus 1.4 g of polymer) which resulted from the polymerization treatment. The total amount of the solid product was suspended in n-hexane (25 ml), and diisoamyl ether (16 g) and TiCl$_4$ (35 g) were added to the suspension at room temperature over about one minute, followed by reaction at 70° C. for one hour. After completion of the reaction, the supernatant liquid was removed by decantation, followed by 5 times repeating a procedure of adding n-hexane (400 ml), stirring for 10 minutes, still standing and removing the supernatant liquid, and drying under reduced pressure to obtain a solid product (III).

(2) Preparation of preactivated catalyst

Into a 2 l capacity stainless steel reactor equipped with slant blades and purged with nitrogen gas were added n-hexane (20 ml), diethylaluminum monochloride (414 mg) and the above solid product (III) (28 mg), and propylene was then reacted with the mixture under a propylene partial pressure of 2 kg/cm$^2$G at 40° C. for 10 minutes (reacted propylene per g of the solid product (III): 16.3 g), followed by removing unreacted propylene and n-hexane under reduced pressure to obtain a preactivated catalyst.

(3) Propylene polymerization

Hydrogen (300 ml) was placed in the reactor containing the preactivated catalyst, and gas phase polymerization was carried out under a propylene partial pressure of 25 kg/cm$^2$G, at a polymerization temperature of 70° C. for 2 hours. After completion of the reaction, methanol (5 g) was introduced and kill reaction was carried out at 70° C. for 30 minutes, followed by cooling down to room temperature and drying to obtain a polymer (182.8 g). The polymer yield per g of the solid product (III) was 6,528 g; the isotactic index and BD of the polymer were 99.8 and 0.50, respectively; the polymer particles were nearly spherical and 98% thereof had sizes between 32 meshes and 60 meshes, 150 meshes-pass being 0.2%. Further no polymer coloration was observed, and the yellowness index was 2.0.

EXAMPLE 2

The solid product (III) obtained in Example 1 was preserved at 40° C. for 4 months, and propylene polymerization was carried out as in Example 1, (2) and (3), using the above solid product.

COMPARATIVE EXAMPLE 1

The solid product (II) obtained in Example 1 was preserved at 40° C. for 4 months as in Example 2 and propylene polymerization was carried out as in Example 1, (2) and (3), using the solid product.

COMPARATIVE EXAMPLE 2

The solid product (II) subjected to the polymerization treatment, obtained in Example 1 was preserved at 40° C. for 4 months as in Example 2, and propylene polymerization was carried out using the solid product.

COMPARATIVE EXAMPLE 3

Propylene polymerization was carried out as in Example 1 except that the solid product (II) was reacted with diisoamyl ether and TiCl$_4$ without subjecting it to polymerization treatment with propylene, to obtain a solid product (III).

EXAMPLE 3

A preactivated catalyst was obtained as in Example 1, (1) and (2), and n-hexane (1,500 ml) and hydrogen (200 ml) were introduced, followed by slurry polymerization under a propylene partial pressure of 10 kg/cm$^2$G at 70° C. for 4 hours. After completion of the polymerization, n-hexane was removed by steam stripping to obtain a polymer.

EXAMPLE 4

Propylene slurry polymerization was carried out as in Example 3 except that the polymerization reaction was carried out at 82° C. in place of 70° C. The particle form, bulk density and isotactic index of the resulting polymer were almost unchanged from those of Example 3.

COMPARATIVE EXAMPLE 4

The solid product (II) obtained in Example 1 was reacted with diisoamyl ether and TiCl$_4$ as in Example 1, but without subjecting the product to polymerization treatment with propylene, to obtain a solid product (III). Propylene polymerization was carried out at 82° C. as in Example 4, using the product. The resulting polymer swelled in n-hexane.

COMPARATIVE EXAMPLE 5

Propylene polymerization was carried out at 82° C. as in Example 4, using the solid product (II) obtained in Example 1. The resulting polymer swelled in n-hexane.

COMPARATIVE EXAMPLE 6

Propylene polymerization was carried out at 82° C. as in Example 4, using the solid product (II) subjected to polymerization treatment, obtained in Example 1. The resulting polymer swelled in n-hexane.

The results of the above Examples and Comparative examples are shown in Table 1.

TABLE 1

| No. of Example or Comparat. ex. | Polymer yield per g of solid product (III) (g) | Isotactic index | BD of polymer | Proportion of particles of 32 to 60 meshes (%) | 150 Meshes pass (%) | MFR* | YI** |
|---|---|---|---|---|---|---|---|
| Ex. 1 | 6,528 | 99.8 | 0.50 | 98 | 0.2 | 4.1 | 2.5 |
| Ex. 2 | 6,200 | 99.0 | 0.50 | 96 | 0.4 | 3.8 | 3.0 |
| Comp. ex. 1 | 1,000 | 98.0 | 0.45 | 60 | 2.4 | 3.8 | 18.0 |
| Comp. ex. 2 | 1,100 | 98.2 | 0.44 | 65 | 1.8 | 3.6 | 17.5 |

TABLE 1-continued

| No. of Example or Comparat. ex. | Polymer yield per g of solid product (III) (g) | Iso-tactic index | BD of polymer | Proportion of particles of 32 to 60 meshes (%) | 150 Meshes pass (%) | MFR* | YI** |
|---|---|---|---|---|---|---|---|
| Comp. ex. 3 | 4,100 | 98.5 | 0.49 | 92.0 | 1.0 | 4.3 | 8.0 |
| Ex. 3 | 6,800 | 99.0 | 0.50 | 96.0 | 0.6 | 4.2 | 2.0 |
| Ex. 4 | 7,200 | 98.0 | 0.49 | 96.0 | 0.8 | 4.1 | 1.8 |
| Comp. ex. 4 | — | — | — | — | — | — | — |
| Comp. ex. 5 | — | — | — | — | — | — | — |
| Comp. ex. 6 | — | — | — | — | — | — | — |

*Melt Flow Rate (according to ASTM D-1238(L))
**Yellowness Index (according to JIS K7103)
Symbol "—" in the Table means "unmeasurable".

EXAMPLE 5 n-Heptane (40 ml), diethylaluminum monochloride (0.05 mol), diisoamyl ether (0.09 mol) and di-n-butyl ether (0.05 mol) were reacted together at 18° C. for 30 minutes to obtain a reaction liquid, which was then dropwise added to TiCl$_4$ (0.275 mol) at 40° C. over 300 minutes, followed by reacting them at the same temperature further for 1.5 hour, raising the temperature up to 65° C., reacting for one hour, removing the supernatant liquid and 6 times repeating a procedure of adding n-hexane (200 ml) and removing the supernatant liquid by decantation to obtain a solid product (II)(18 g), which was then suspended in n-hexane (500 ml), followed by adding diethylaluminum monochloride (2 g) to the suspension, adding and reacting propylene (1 g) at 60° C. for one hour to obtain a solid product (II) subjected to polymerization treatment (amount of propylene reacted: 0.3 g). After the reaction, the supernatant liquid was removed, followed by twice repeating a procedure of adding n-hexane (300 ml) and removing the supernatant liquid by decantation, suspending the solid product (II) (18.3 g) subjected to the polymerization treatment, in n-hexane (40 ml), adding TiCl$_4$ (18 g) and n-butyl ether (18 g) to the suspension and reacting them at 60° C. for 3 hours. After completion of the reaction, the supernatant liquid was removed by decantation, followed by 3 times repeating a procedure of adding n-hexane (200 ml), stirring for 5 minutes, still standing and removing the supernatant liquid, and drying under reduced pressure to obtain a solid product (III). Propylene polymerization was carried out as in Example 1, (2) and (3), using the above solid.

EXAMPLE 6 n-Octane (80 ml), diisopropylaluminum monochloride (0.05 mol) and di-n-octyl ether (0.11 mol) were reacted together at 35° C. for 4 hours to obtain a reaction liquid, which was then dropwise added to TiCl$_4$ (0.25 mol) at 31° C. over 120 minutes, followed by reacting them at 40° C. for 30 minutes, raising the temperature up to 85° C., reacting for 30 minutes, adding propylene (20 g) at the same temperature, reacting for 30 minutes, removing the liquid by filtering-off, and twice repeating a procedure of adding n-octane (300 ml), stirring for 5 minutes and filtering-off to obtain a solid product (II) subjected to polymerization treatment (amount of solid product (II): 17.5 g, amount of propylene reacted: 0.1 g). To this solid product subjected to polymerization treatment were added n-octane (40 ml), diisoamyl ether (22 g) and TiCl$_4$ (14 g), followed by reacting them at 85° C. for 30 minutes, filtering off, 4 times repeating a procedure of adding n-pentane (100 ml), stirring for 10 minutes and filtering off, and drying to obtain a solid product (III). Propylene polymerization was carried out as in Example 1, (2) and (3), using the above product.

EXAMPLE 7

A solid product (III) was obtained as in Example 1 except that di-n-butylaluminum monochloride (0.04 mol) was used in place of diethylaluminum monochloride (0.05 mol) to obtain a reaction liquid (I), which was then dropwise added to TiCl$_4$ at 45° C. Propylene polymerization was carried out as in Example 1, using the solid product (III).

EXAMPLE 8

A solid product (III) was obtained as in Example 1 except that diisoamyl ether (22 g), TiCl$_4$ (20 g) and SiCl$_4$ (18 g) were added to the solid product (II) subjected to polymerization treatment, obtained in Example 1. Propylene polymerization was carried out using the above product.

EXAMPLE 9

A solid product (III) was obtained as in Example 1 except that di-n-pentyl ether (28 g) and anhydrous aluminum trichloride (5 g) were added to n-heptane (100 ml) and they were reacted together at 80° C. for 2 hours to obtain a solution to which a solid product (II)(20.4 g) subjected to polymerization treatment, obtained as in Example 1 was added, followed by reaction at 80° C. for 2 hours. Propylene polymerization was carried out using the above solid product.

EXAMPLE 10

A solid product (III) was obtained as in Example 5 except that TiCl$_4$ (35 g), diisoamyl ether (12.0 g) and di-n-butyl ether (6 g) were added to the solid product (II) (18.3 g) subjected to polymerization treatment, obtained in Example 5. Propylene polymerization was carried out using the above product.

EXAMPLE 11

Triisobutylaluminum (0.03 mol) and di-n-dodecyl ether (0.07 mol) were reacted together in n-hexane (100 ml) at 20° C. for 40 minutes to obtain a reaction liquid, which was then dropwise added to TiCl$_4$ (0.18 mol) at 20° C. over 2 hours, followed by adding propylene (4 g), reacting them at 30° C. for 30 minutes and at 50° C. for 60 minutes, removing the liquid portion by filtering off and washing with n-hexane to obtain a solid product (II) (23.8 g) subjected to polymerization treatment (amount of propylene reacted: 0.8 g). To this product were added n-heptane (50 ml), di-n-butyl ether (21 g) and TiCl$_4$ (40 g), followed by reacting them at 50° C. for 140 minutes, filtering off, washing with n-hexane and drying to obtain a solid product (III). Propylene polymerization was carried out as in Example 1, using the above solid.

EXAMPLE 12

Triethylaluminum (0.07 mol) and diisoamyl ether (0.1 mol) were reacted together in n-hexane (45 ml) at 40° C. for 4 hours to obtain a reaction liquid, which was then dropwise added to TiCl$_4$ (0.84 mol) at 32° C. over 4 hours, followed by keeping the temperature at 35° C. for one hour, adding propylene (10 g), raising the temperature up to 78° C., reacting for 2 hours, filtering off, washing with n-hexane and drying to obtain a solid product (II) (24 g) subjected to polymerization treatment (amount of propylene reacted: 1.0 g). This solid product (II) subjected to polymerization treatment was added to a reaction liquid obtained by reacting together n-hexane (40 ml), diisoamyl ether (27 g) and TiCl$_4$ (20 g) at 35° C. for 30 minutes, and the resulting mixture was reacted at 75° C. for one hour, followed by filtering off, washing with n-hexane and drying to obtain a solid product (III). Propylene polymerization was carried out as in Example 1, using the above product.

EXAMPLE 13

A solid product (III) was obtained as in Example 1 except that propylene (2.85 g) was replaced by butene-1 (6 g) to obtain a solid product (II) (20.9 g) (amount of butene-1 reacted: 0.9 g). Propylene polymerization was carried out as in Example 1, using the above product.

EXAMPLE 14

A solid product (III) was obtained as in Example 13 except that butene-1 (6 g) was replaced by ethylene (4.0 g) to obtain a solid product (II) (20.6 g) (amount of ethylene reacted: 0.6 g). Propylene polymerization was carried out as in Example 1, using the above product.

EXAMPLE 15

In the reactor of Example 1, (2) were placed and mixed together n-pentane (4 ml), diethylaluminum monochloride (160 mg), the solid product (III) (28 mg) obtained in Example 1 and polypropylene powder (5 g), followed by removing n-pentane under reduced pressure. The resulting material was subjected to gas phase reaction under a propylene partial pressure of 0.8 kg/cm$^2$G at 30° C. for 20 minutes while the catalyst was fluidized with propylene gas, followed by removing unreacted propylene to obtain a preactivated catalyst (amount of propylene reacted per g of the solid product (III): 1.6 g). Using this catalyst, propylene gas phase polymerization was carried out as in Example 1, (3).

EXAMPLE 16

Di-n-butylaluminum monochloride (120 mg) and the solid product (III) (28 mg) obtained in Example 5 were put in propylene (20 g) at 20° C., and they were reacted together under 9.8 kg/cm$^2$G for 10 minutes, followed by removing unreacted propylene to obtain a preactivated catalyst in the form of powder (amount of propylene reacted per g of the solid product (III): 110 g). Using this catalyst, propylene gas phase polymerization was carried out as in Example 1, (3).

EXAMPLE 17

Example 1 was repeated except that, in the preactivation in Example 1, (2), ethylene was used in place of propylene, and ethylene was reacted under an ethylene pressure of 1 kg/cm$^2$G at 35° C. for 10 minutes (amount of ethylene reacted per g of the solid product (III): 2.4 g).

EXAMPLE 18

Example 1 was repeated except that, in the preactivation in Example 1, butene-1 was used in place of propylene, and butene-1 was reacted under a butene pressure of 0.5 kg/cm$^2$G at 35° C. for 10 minutes (amount of butene-1 reacted per g of the solid product (III): 0.3 g).

EXAMPLE 19

Example 1 was repeated except that diisopropylaluminum monochloride (380 mg) was used in place of diethylaluminum monochloride (420 mg) in Example 1, (2).

EXAMPLE 20

Preactivation was carried out as in Example 1, (2) except that triethylaluminum (320 mg) was used in place of diethylaluminum monochloride (420 mg), and a polymer was obtained as in Example 1, (3) except that ethylene polymerization was carried out under a hydrogen pressure of 12 kg/cm$^2$G and an ethylene partial pressure of 12 kg/cm$^2$G at 85° C.

EXAMPLE 21

A preactivated catalyst was obtained as in Example 1, (1) and (2), and hydrogen (300 ml) and propylene (600 g) were introduced, followed by bulk polymerization under a propylene partial pressure of 31 kg/cm$^2$G at 70° C. for one hour. After completion of the reaction, propylene was purged and post-treatment was carried out as in Example 1 to obtain a polymer.

The results of Examples 5 to 21 are shown in Table 2.

TABLE 2

| No. of Example or Comparat. ex. | Polymer yield per g of solid product (III) (g) | Isotactic index | BD of polymer | Proportion of particles of 32 to 60 meshes (%) | 150 Meshes pass (%) | MFR* | YI** |
|---|---|---|---|---|---|---|---|
| Example 5 | 6,400 | 99.6 | 0.50 | 98.2 | 0.3 | 4.2 | 2.8 |
| Example 6 | 6,200 | 99.3 | 0.50 | 98.0 | 0.4 | 4.1 | 2.8 |
| Example 7 | 6,300 | 99.0 | 0.48 | 95.0 | 0.2 | 4.8 | 2.5 |
| Example 8 | 6,400 | 98.0 | 0.48 | 98.0 | 0.3 | 4.1 | 2.8 |
| Example 9 | 6,200 | 98.0 | 0.46 | 98.0 | 0.4 | 4.9 | 2.8 |
| Example 10 | 6,800 | 99.6 | 0.50 | 98.0 | 0.3 | 3.8 | 2.0 |
| Example 11 | 6,200 | 98.0 | 0.48 | 95.0 | 0.5 | 3.2 | 2.8 |
| Example 12 | 6,300 | 99.0 | 0.50 | 94.0 | 0.4 | 3.8 | 2.5 |
| Example 13 | 6,500 | 99.0 | 0.50 | 96.0 | 0.2 | 3.8 | 2.5 |
| Example 14 | 6,200 | 99.0 | 0.50 | 95.0 | 0.3 | 3.2 | 2.8 |
| Example 15 | 6,520 | 99.0 | 0.50 | 96.0 | 0.2 | 3.4 | 2.5 |

TABLE 2-continued

| No. of Example or Comparat. ex. | Polymer yield per g of solid product (III) (g) | Iso-tactic index | BD of polymer | Proportion of particles of 32 to 60 meshes (%) | 150 Meshes pass (%) | MFR* | YI** |
| --- | --- | --- | --- | --- | --- | --- | --- |
| Example 16 | 6,400 | 99.0 | 0.49 | 94.0 | 0.2 | 3.8 | 2.6 |
| Example 17 | 6,200 | 98.5 | 0.46 | 92.0 | 0.6 | 3.4 | 2.9 |
| Example 18 | 6,450 | 99.0 | 0.50 | 96.0 | 0.5 | 4.3 | 2.6 |
| Example 19 | 6,200 | 98.5 | 0.48 | 92.0 | 0.6 | 4.2 | 2.9 |
| Example 20 | 6,900 | — | 0.46 | 92.0 | 0.4 | 4.1 | 2.0 |
| Example 21 | 6,400 | 99.0 | 0.50 | 98.0 | 0.2 | 4.3 | 2.2 |

EXAMPLE 22

A preactivated catalyst in the form of powder was obtained in a reactor as in Example 1, (1) and (2), and hydrogen (300 ml) and propylene (200 g) were introduced, followed by bulk polymerization under a propylene pressure of 26 kg/cm$^2$G at 60° C. for 30 minutes to polymerize propylene (35 g). While the resulting slurry containing unreacted propylene was flashed into a 20 l capacity fluidized bed of 20 cm in diameter equipped with an agitation element, and propylene was circulated at a reaction temperature of 70° C., under a propylene partial pressure of 21 kg/cm$^2$G, at a flow rate of 5 cm/sec., gas phase polymerization was carried out under fluidization of polymer for 2 hours, followed by post-treatment as in Example 1 to obtain a polymer.

EXAMPLE 23

Bulk polymerization was carried out under 26 kg/cm$^2$G, at 60° C. for 30 minutes as in Example 21. Unreacted liquefied propylene was transferred into a separate feed tank connected to the reactor, and the temperature of the reactor was raised up to 72° C. While propylene was fed into the reactor through the feed tank so as to give a polymerization pressure of 26 kg/cm$^2$G, gas phase polymerization was carried out for 2 hours, followed by post-treatment as in Example 1 to obtain a polymer.

EXAMPLE 24

Bulk polymerization was carried out under 26 kg/cm$^2$G, at 60° C. for 30 minutes as in Example 21. When the polymerization temperature was raised up to 70° C., the polymerization pressure reached 31 kg/cm$^2$G. When the polymerization was continued as it was, the pressure lowered down to 26 kg/cm$^2$G in 40 minutes, during which bulk polymerization moved continuously to gas phase polymerization. Further, while propylene was fed for 60 minutes so as to keep 26 kg/cm$^2$G, gas phase polymerization was carried out, followed by post-treatment as in Example 1.

EXAMPLE 25 n-Hexane (1,000 ml), diethylaluminum monochloride (320 mg) and the solid product (III) (18 mg) obtained in Example 5 were introduced into a reactor, and propylene was reacted under a propylene partial pressure of 1.2 kg/cm$^2$G at 20° C. for 10 minutes to carry out preactivation (amount of propylene reacted per g of the solid product (III): 0.6 g). Unreacted propylene was then purged, and hydrogen (120 ml) was introduced, followed by slurry polymerization under a propylene partial pressure of 10 kg/cm$^2$G at 70° C. for 2.5 hours. n-Hexane was removed by steam stripping to obtain a polymer.

EXAMPLE 26 n-Pentane (80 ml), diethylaluminum monochloride (280 mg) and the solid product (II) (25 mg) obtained in Example 5 were introduced into a reactor. Propylene was then reacted with them at 15° C. while its partial pressure was raised up to 5 kg/cm$^2$G in 5 minutes (1 kg/cm$^2$G/min.) to carry out preactivation (amount of propylene reacted per g of the solid product (III): 3.2 g). Unreacted propylene was purged and hydrogen (200 ml) was introduced, followed by slurry polymerization under a propylene partial pressure of 10 kg/cm$^2$G at 70° C. for 60 minutes to polymerize propylene (63 g). The resulting solvent-containing slurry was introduced into a fluidized bed equipped with an agitating element, followed by propylene gas phase polymerization as in Example 22.

EXAMPLE 27 n-Hexane (1,000 ml), diethylaluminum monochloride (320 mg) and the solid product (III)(30 mg) obtained in Example 5 were introduced into a reactor, and hydrogen (120 ml) was introduced without preactivation, followed by slurry polymerization under a propylene partial pressure of 10 kg/cm$^2$G, at 70° C. for 2.5 hours. n-Hexane was then removed by steam stripping to obtain a polymer.

EXAMPLE 28

Propylene slurry polymerization was carried out using a catalyst not subjected to preactivation as in Example 27, followed by purging unreacted propylene and hydrogen and distilling off n-hexane under reduced pressure till it was contained in an amount of 30% in the resulting polymer. This solvent-containing polymer was introduced into a fluidized bed equipped with an agitating element, same as in Example 22, and hydrogen (450 ml) was introduced, followed by gas phase polymerization under a propylene partial pressure of 21 kg/cm$^2$G, at 70° C. for 2 hours as in Example 22, and then post-treatment as in Example 1 to obtain a polymer.

EXAMPLE 29

Propylene ethylene block copolymerization was carried out as in Example 28 except that the first stage slurry polymerization was carried out with propylene and the second stage gas phase polymerization was carried out with ethylene under a hydrogen partial pressure of 8 kg/cm$^2$G and an ethylene partial pressure of 12 kg/cm$^2$G at 70° C. for 2 hours.

EXAMPLE 30

A polymer (propylene-ethylene copolymer) was obtained as in Example 22 except that propylene (200 g)

and ethylene (20 g) were used in place of propylene (200 g).

EXAMPLE 31

A polymer (propylene-butene-1 copolymer) was obtained as in Example 30 except that butene-1 (30 g) was used in place of ethylene (20 g).

EXAMPLE 32

A polymer was obtained as in Example 1 except that using the preactivated catalyst, ethylene polymerization was carried out under a hydrogen partial pressure of 12 kg/cm²G and an ethylene partial pressure of 12 kg/cm²G at 85° C. in place of propylene polymerization using hydrogen (300 ml), under a propylene partial pressure of 25 kg/cm at 70° C.

EXAMPLE 33

The solid product (III) (300 mg) obtained in Example 1 and diethylaluminum monochloride (3,000 mg) were suspended in n-hexane (200 ml) and the resulting suspension was reacted with propylene under a propylene partial pressure of 1.3 kg/cm²G at 20° C. for 10 minutes, followed by purging unreacted propylene and preserving the resulting material with stirring at 30° C. for one week. The resulting catalyst slurry containing the solid product (III) (25 mg) was introduced into a polymerization vessel, followed by propylene slurry polymerization and gas phase polymerization as in Example 26.

COMPARATIVE EXAMPLE 7 to 9

Using the following respective solid products in place of the solid product (III) obtained in Example 1, the resulting respective catalyst slurries were preserved at 40° C. for one week, followed by propylene polymerization:

Comparative example 7: solid product (II) obtained in Example 1,
Comparative example 8: solid product (II) subjected to polymerization treatment, obtained in Example 1, and
Comparative example 9: solid product (III) obtained in Comparative example 3.

The results of Examples 22 to 33 and Comparative examples 7 to 9 are shown in Table 3.

TABLE 3

| No. of Example or Comparat. ex. | Polymer yield per g of solid product (III) (g) | Iso-tactic index | BD of polymer | Proportion of particles of 32 to 60 meshes (%) | 150 Meshes pass (%) | MFR* | YI** |
|---|---|---|---|---|---|---|---|
| Example 22 | 7,200 | 99.2 | 0.49 | 95.0 | 0.3 | 2.6 | 2.0 |
| Example 23 | 7,400 | 99.0 | 0.49 | 96.0 | 0.2 | 2.9 | 1.5 |
| Example 24 | 7,100 | 99.2 | 0.50 | 96.0 | 0.3 | 3.8 | 2.2 |
| Example 25 | 6,700 | 99.4 | 0.50 | 94.0 | 0.3 | 3.8 | 2.1 |
| Example 26 | 7,100 | 99.0 | 0.49 | 96.0 | 0.2 | 3.8 | 2.0 |
| Example 27 | 6,200 | 99.0 | 0.45 | 91.0 | 0.2 | 3.4 | 3.0 |
| Example 28 | 7,400 | 98.5 | 0.45 | 90.0 | 0.2 | 3.6 | 1.5 |
| Example 29 | 7,500 | 98.0 | 0.45 | 90.0 | 0.2 | 3.4 | 1.5 |
| Example 30 | 7,600 | 98.0 | 0.46 | 91.4 | 0.2 | 3.2 | 1.4 |
| Example 31 | 7,500 | 98.0 | 0.46 | 92.0 | 0.2 | 3.8 | 1.8 |
| Example 32 | 6,600 | — | 0.45 | 90.0 | 0.3 | 4.1 | 2.4 |
| Example 33 | 6,200 | 98.5 | 0.46 | 90.0 | 0.9 | 2.9 | 3.0 |
| Comp. ex. 7 | 600 | 98.5 | 0.45 | 90.0 | 4.8 | 2.9 | >20 |
| Comp. ex. 8 | 700 | 98.5 | 0.45 | 92.0 | 4.2 | 2.9 | >20 |
| Comp. ex. 9 | 4,200 | 98.5 | 0.45 | 93.0 | 2.2 | 2.9 | 4.0 |

What is claimed is:

1. A process for producing polymers which comprises polymerizing at least one mono-alpha-olefin selected from the group consisting of ethylene, propylene, butene-1, hexene-1 and heptene-1 or styrene, or a mixture thereof, in the presence of a catalyst obtained by reacting a reaction product (I) of at least one organoaluminum compound, selected from the group consisting of trialkylaluminums and dialkylaluminum monohalides with an ether, with $TiCl_4$ in a molar ratio of said organoaluminum compound used in the preparation of said reaction product (I) to $TiCl_4$ of 0.06 to 0.3, to form a solid product (II), and during this reaction or after completion of the reaction, subjecting the solid product (II) to a polymerization treatment with a mono-alpha-olefin or styrene; further reacting the thus treated solid products (II) with an ether and $TiCl_4$ to obtain a solid product (III); and combining this solid product (III) with an organoaluminum compound.

2. A process according to claim 1 which comprises the steps of
    (a) reacting one mol of an organoaluminum compound with 1 to 4 mols of an ether in a solvent at a temperature of −20° to 200° C., to obtain a reaction product (I);
    (b) reacting this reaction product (I) with $TiCl_4$ at a temperature of 0° to 200° C. in a ratio of the number of Al atoms to that of Ti atoms of 0.06 to 0.3 to form a solid product (II), and during this reaction step or after completion of the reaction, subjecting the solid product (II) to a polymerization treatment of contacting the product (II) with 10 to 5,000 g of an alpha-olefin based on 100 g of the solid product (II), under polymerizable conditions, to obtain a solid product (II) subjected to the polymerization treatment;
    (c) reacting 100 g of this solid product (II) subjected to the polymerization treatment, with 50 to 200 g of an ether electron donor and 20 to 500 g of $TiCl_4$ at a temperature of 40° to 200° C., to obtain a solid product (III); and
    (d) polymerizing an alpha-olefin or alpha-olefins in the presence of a catalyst comprising a combination of said solid product (III) with an organoaluminum compound.

3. A process according to claim 1 wherein during the reaction step of the reaction product (I) with $TiCl_4$ or after completion of the reaction, said polymerization treament is carried out by passing the mono-alpha-olefin or styrene under the atmospheric pressure or adding it so as to give a pressure of 10 kg/cm²G or lower, and at a reaction temperature of 30° to 90° C.

4. A process according to claim 1 wherein after completion of the reaction of the reaction product (I) with TiCl$^4$, said polymerization treatment is carried out by removing the resulting liquid portion, suspending the resulting solid product (II) in a solvent to form a suspension, and adding an organoaluminum compound and a mono-alpha-olefin or styrene under 0 to 10 kg/cm$^2$G to the suspension to polymerize the mono-alpha-olefin or styrene.

5. A process according to claim 4 wherein the amounts of said organoaluminum compound and the added mono-alpha-olefin or styrene is in the range of 5 to 500 g and in the range of 10 to 5,000 g, respectively, each based on 100 g of the solid product (II), and the reaction temperature is in the range of 30° to 90° C.

6. A process according to claim 2 wherein the reaction product (I) in the form of liquid, obtained by reacting an organoaluminum with an ether is used, as it is, in the subsequent reaction.

7. A process according to claim 1 wherein said polymerization is carried out by gas phase polymerization.

8. A process according to claim 1 wherein said polymerization is carried out by slurry polymerization followed by gas phase polymerization.

9. A process according to claim 1 wherein said organoaluminum compound is expressed by the general formula AlR$_n$R'$_{n'}$X$_{3-(n+n')}$ wherein R and R' each represent alkyl, aryl, alkaryl, cycloalkyl or alkoxy group; X represents fluorine, chlorine, bromine or iodine; and n and n' each represent a number satisfying a relationship of $0 < n+n' \leq 3$.

10. A process according to claim 1 wherein said polymerization is carried out by bulk polymerization followed by gas phase polymerization.

11. A process according to claim 2 wherein said solvent is an aliphatic hydrocarbon.

12. A process according to claim 1 wherein said reaction of said solid product (II) with an ether and TiCl$_4$ is carried out in an aliphatic hydrocarbon.

13. A process according to claim 1 wherein said reaction of said product (II) with an ether and TiCl$_4$ is carried out by reacting said ether with TiCl$_4$ in advance at a temperature of 10° to 100° C. for a time of 30 minutes to 2 hours; cooling the resulting reaction product; and reacting this reaction product with said solid product (II).

14. A process according to claim 1 wherein said catalyst is preactivated by further reacting an alpha-olefin with said combination of the solid product (III) with an organoaluminum compound and the resulting preactivated catalyst is used for alpha-olefin polymerization.

15. A process according to claim 14 wherein the preactivation is carried out by using 0.1 to 500 g of an organoaluminum compound, 0 to 50 l of a solvent, 0 to 1,000 ml of hydrogen and 0.05 to 5,000 g of an alpha-olefin, each based on 1 g of the solid product (III), and reacting said alpha-olefin at a temperature of 0° to 100° C. to form 0.01 to 2,000 g of said alpha-olefin reacted, based on 1 g of the solid product (III).

* * * * *